US010660384B2

(12) United States Patent
Lauf et al.

(10) Patent No.: US 10,660,384 B2
(45) Date of Patent: May 26, 2020

(54) SAFETY VEST WITH MODULAR LIGHTING SYSTEM

(71) Applicants: Philip F. Lauf, Woodstock, IL (US); Jeffrey W. Stoltz, Franklin, NC (US)

(72) Inventors: Philip F. Lauf, Woodstock, IL (US); Jeffrey W. Stoltz, Franklin, NC (US)

( * ) Notice: Subject to any disclaimer, the term of this patent is extended or adjusted under 35 U.S.C. 154(b) by 76 days.

(21) Appl. No.: 16/350,163

(22) Filed: Oct. 5, 2018

(65) Prior Publication Data

US 2019/0104777 A1 Apr. 11, 2019

Related U.S. Application Data

(60) Provisional application No. 62/606,756, filed on Oct. 10, 2017.

(51) Int. Cl.

| | |
|---|---|
| ***A41D 13/01*** | (2006.01) |
| ***F21V 33/00*** | (2006.01) |
| ***A41D 1/04*** | (2006.01) |
| ***G05B 5/00*** | (2006.01) |
| ***G08B 5/00*** | (2006.01) |
| ***G08B 5/38*** | (2006.01) |

(52) U.S. Cl.
CPC ............... *A41D 13/01* (2013.01); *A41D 1/04* (2013.01); *F21V 33/0008* (2013.01); *G08B 5/004* (2013.01); *G08B 5/38* (2013.01)

(58) Field of Classification Search
CPC . A41D 13/01; A41D 1/04; G08B 5/38; G08B 5/004; F21V 33/0008
See application file for complete search history.

(56) References Cited

U.S. PATENT DOCUMENTS

| | | | | |
|---|---|---|---|---|
| 4,839,777 | A | 6/1989 | Janko et al. | |
| 5,070,436 | A | 12/1991 | Alexander et al. | |
| 5,690,411 | A * | 11/1997 | Jackman | A41D 13/01 362/103 |
| 6,267,482 | B1 | 7/2001 | Miller et al. | |
| 6,517,214 | B1 | 2/2003 | Mitchell et al. | |
| 8,408,731 | B1 | 4/2013 | Joyner | |
| 8,616,719 | B1 | 12/2013 | Barze | |
| D734,552 | S | 7/2015 | Jones et al. | |
| 9,206,969 | B2 * | 12/2015 | Bushee | F21V 23/0414 |
| 9,243,797 | B2 | 1/2016 | Leung | |
| 10,231,493 | B1 * | 3/2019 | Sarantos | A41D 1/04 |
| 2004/0114350 | A1 | 6/2004 | Golle et al. | |
| 2006/0026731 | A1 * | 2/2006 | Qashou | A41D 31/04 2/69 |
| 2006/0034064 | A1 * | 2/2006 | Kanzler | A41D 13/01 362/84 |
| 2008/0043458 | A1 | 2/2008 | Desjardin | |
| 2011/0235311 | A1 | 9/2011 | Stone | |

(Continued)

*Primary Examiner* — Tracie Y Green
(74) *Attorney, Agent, or Firm* — Robert J. Lauf

(57) ABSTRACT

A personal lighting system includes: a wearable safety garment having a front surface and a rear surface, including reflective and high-visibility materials; a battery pack contained in a weather resistant pocket formed on the rear surface; adjustable water-resistant front LED modules located on the front surface; water-resistant power cables running from the front LED modules to the battery, the cables concealed under flush-mounted reflective strips; and, at least one water-resistant rear LED module located on the rear surface.

15 Claims, 4 Drawing Sheets

(56) References Cited

U.S. PATENT DOCUMENTS

| | | | | |
|---|---|---|---|---|
| 2014/0022766 | A1 | 1/2014 | Wright | |
| 2014/0355256 | A1 | 12/2014 | Curtis | |
| 2016/0062149 | A1* | 3/2016 | Gerton | G02C 7/104 351/43 |
| 2016/0068214 | A1* | 3/2016 | Tang | B62J 6/00 362/108 |
| 2016/0073706 | A1 | 3/2016 | Hartnett et al. | |
| 2018/0249133 | A1* | 8/2018 | Thiel | H01M 2/0207 |
| 2019/0037934 | A1* | 2/2019 | Swank | H04W 4/90 |

* cited by examiner

SAFETY VEST WITH MODULAR LIGHTING SYSTEM

CROSS-REFERENCE TO RELATED APPLICATION

This application claims the benefit of Provisional Patent Application No. 62/606,756 filed on Oct. 10, 2017 by the present inventors, the entire disclosure of which is incorporated herein by reference.

BACKGROUND OF THE INVENTION

Field of the Invention

The invention pertains to safety equipment that provides enhanced visibility for the wearer, and more particularly to safety vests having integrated modular lighting systems.

Description of Related Art

When performing tasks in low light situations, people need to provide portable supplemental light. Traditional options include flashlights, lanterns or head lamps, all of which have their drawbacks. Flashlights and lanterns are generally handheld or if placed on a stationary setting need to be moved periodically to optimize light projection relative to the user. Also the user needs to dedicate a hand to control or aim the light, limiting the task to what can be performed using one hand.

In more recent times battery operated headlamps have become popular but those too have limitations. The user must always be using neck muscles to direct the light to where it is needed. As headlamps become larger and more powerful they also become heavier, placing additional strain on the neck muscles. In some cases, particularly for use over an extended period, such as a work shift in a mine, the battery is so large that it is mounted on the user's belt and connected to the headlamp by a power cord. The cord is cumbersome and in some cases presents a hazard if moving equipment might snag the cord while it is in use.

Lastly there are other portable light systems that can connect to a generator or electrical outlet but those are very limited in that they are typically heavy and cumbersome to set up and move. Additionally workers generally have such apparatus set up behind them so they find themselves working in their own shadows.

Various approaches have been described to integrate lighting devices into existing safety vests as are often provided to first responders, railroad workers, construction crews, and miners.

U.S. Pat. No. 4,839,777 discloses an illuminated garment that includes an electrically conductive harness mounted at predetermined locations in the outer surface of the garment.

U.S. Pat. No. 5,070,436 discloses a signal vest made of durable bright colored and reflective materials and equipped front and back with flashing lights, controlled by self-contained electrical circuits operating independently of one another so that any damage to one will not affect the others.

U.S. Pat. No. 6,267,482 discloses a reflective safety vest with a multiple light assembly sandwiched between the garment and the reflective material so that the multiple light assembly is invisible when not energized.

U.S. Pat. No. 6,517,214 discloses a lighted vest with a plurality of electric lamps on both its front and rear panels.

U.S. Pat. No. 8,408,731 discloses a safety vest assembly in which a lighting unit is held in a front pocket and is visible through a front panel.

U.S. Pat. No. 8,616,719 discloses a safety vest having LED lights arranged in rows of three; it is taught that the row width and set arrangements provide visibility from virtually any viewing angle.

U.S. Pat. No. 9,243,797 discloses wearing apparel having a flexible LED lighting strip running along existing seams from improved freedom of movement by the wearer.

U.S. Pat. Appl. Pub. 2004/0114350 discloses a safety vest having electroluminescent lighting strips.

U.S. Pat. Appl. Pub. 2008/0043458 discloses a safety garment having lights attached to a reflective layer and positioned within an aperture of a protective cover. The reflective layer may be removable and the lights may emit non-visible (IR or UV) light.

U.S. Pat. Appl. Pub. 2011/0235311 discloses garments having white LED strips on the front and red LED strips on the rear, to enhance the visibility of pedestrians and cyclists.

U.S. Pat. Appl. Pub. 2014/0022766 discloses a safety garment having reflective tape and Electro Illuminating Wire, a type of electroluminescent device.

U.S. Pat. Appl. Pub. 2014/0355256 discloses a coat for an animal or pet, in which LED strips are located in the trim of the garment.

U.S. Pat. Appl. Pub. 2016/0073706 discloses a garment to be worn over a motorcyclist's outer clothing, having high-intensity LED lighting on the front and rear. A motion-sensing circuit detects motorcycle deceleration and controls the sequence, color, and or intensity of the LED lighting in response.

Objects and Advantages

Objects of the present invention include the following: providing a body worn, hands free, weather resistant, variable task level lighting system; providing a modified safety vest that will allow the user to perform tasks in low level light situations; providing a wearable garment that increases a user's visibility to others; providing a personal lighting system that helps to prevent accidents; and, providing a wearable lighting system with separately adjustable lighting modules powered by a common power source. These and other objects and advantages of the invention will become apparent from consideration of the following specification, read in conjunction with the drawings.

SUMMARY OF THE INVENTION

According to one aspect of the invention, a personal lighting system comprises:

a wearable safety garment having a front surface and a rear surface, at least a portion of which comprise reflective materials;

a battery pack contained in a weather resistant pocket on the rear surface;

a plurality of adjustable water-resistant front LED devices located on the front surface;

water-resistant power cables running from the front LED modules to the battery, the cables concealed under flush-mounted reflective strips; and, at least one water-resistant rear LED module located on the rear surface.

According to another aspect of the invention, a personal lighting system comprises:

a water-resistant wearable, high-visibility safety garment having a front surface and a rear surface, at least a portion of which comprise reflective materials;

a battery pack contained in a weather resistant pocket on the rear surface;

a plurality of adjustable water-resistant front LED modules located on the front surface and wherein, each front LED module comprises a plurality of LEDs of selected color whose output may be adjusted by a user among a plurality of power levels, each front LED module includes an adjustable mounting bracket providing a range of rotational adjustment and having a plurality of detents to hold the module in the selected position after adjustment, and, each mounting bracket is attached to the surface of the vest by a hook and loop fastener so that the position of the front LED module may adjusted over some selected area of the front surface;

water-resistant power cables running from the front LED modules to the battery, the cables concealed under flush-mounted reflective strips; and, at least one water-resistant rear LED module located on the rear surface, and further comprising:

LED devices of a selected color, an integral rechargeable battery, and a control circuit.

According to another aspect of the invention, an LED light module comprises:

a water resistant housing and power cable;

a plurality of LED devices located inside the water-resistant housing and visible through a substantially transparent front cover;

an electronic control circuit capable of driving the LED devices in any of a plurality of user-selectable modes;

a metal heat sink in thermal contact with the LED devices, extending outwardly around the periphery of the housing and terminating in a plurality of cooling fins;

a mounting bracket attached to the rear of the housing and having a rotating coupling with detents so that the module may be rotated among a plurality of positions and retained in a selected position by the detent; and, a hook and loop material on the rear surface of the bracket to removably mount the module to the surface of a compatible fabric.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIG. 4A illustrates the front view and FIG. 4B illustrates the side view.

DETAILED DESCRIPTION OF THE INVENTION

The invention relates generally to a weather-resistant device that gives a user a variable supply of portable, hands-free, task-level lighting, in a modular system. Users working in dark areas doing construction, repair work or inspection have a need for hands free mobile lighting as do sportsmen, campers, joggers, bike riders, rescue and security workers etc. Furthermore the invention helps insure the person is visible to others around him; those walking or riding on bicycles or cars or other vehicles, those operating heavy equipment in such places as construction sites, or those operating material handling and transportation equipment commonly found in ports, trucking terminals, warehouses, and rail yards, will all have greater visibility of a person wearing this mobile light system. The light system is modular and can be torn away from the garment in case it is snagged and can also be removed and placed on another vest if the original vest fabric becomes worn, damaged or needs cleaning. If the light system fails it can easily be replaced without discarding the original vest.

The following examples describe various aspects of the invention. They are provided for illustrative purposes only, to provide a fuller understanding of the invention and how it can be made and used. A person of ordinary skill in the art may adapt the invention to other applications and variations by the use of routine experimentation.

EXAMPLE

Figure 1:
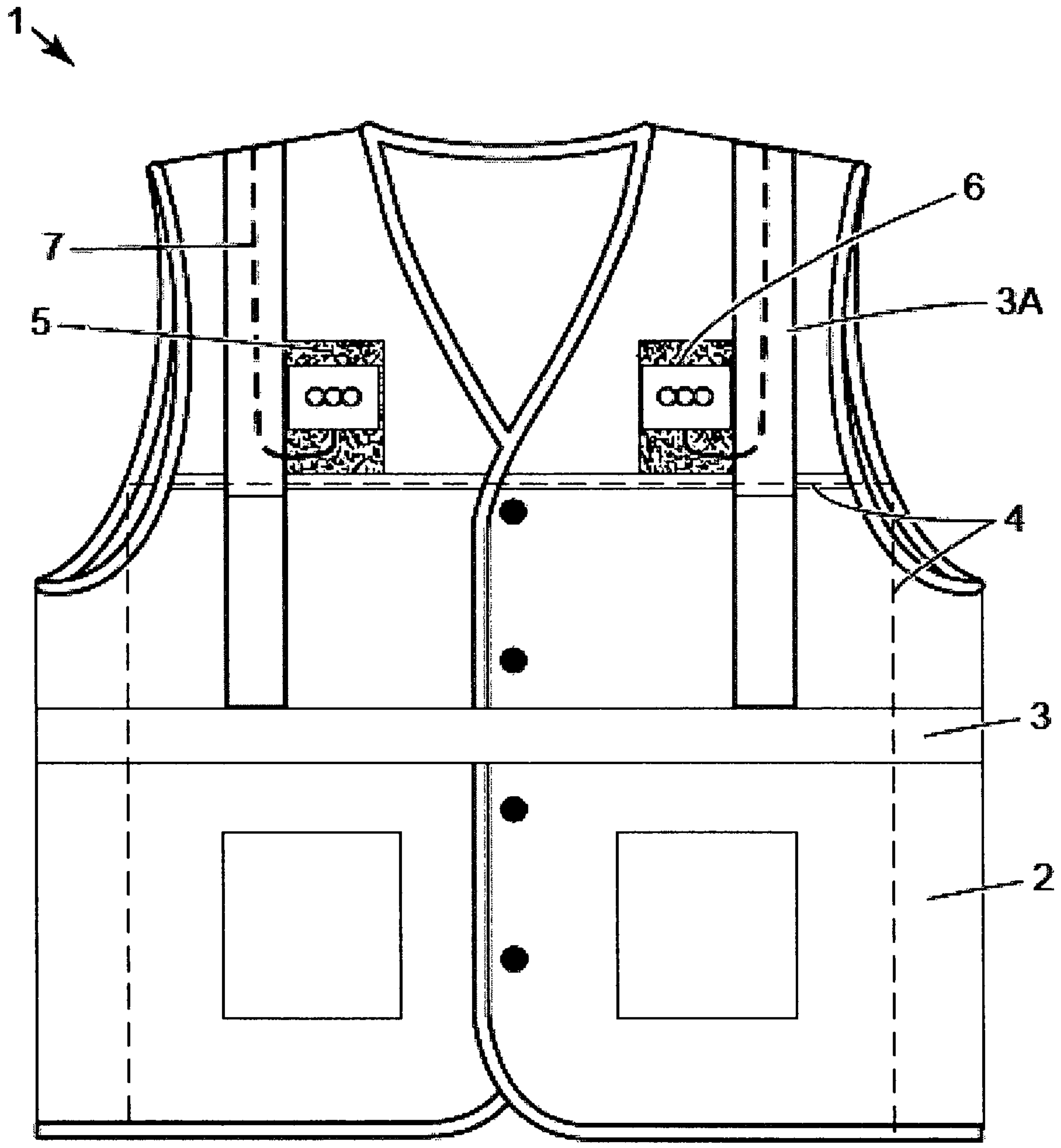
FIG. 1 is a schematic diagram of the front view of a safety vest in accordance with one aspect of the present invention.

FIG. 1 illustrates the front view of a safety vest 1 incorporating some of the inventive features. In this example, the vest generally conforms to ANSI Class 2; it is constructed from safety yellow polyester fabric 2 with reflective strips 3. Optional tear-away seams 4, constructed of strips of hook-and-loop material, may be provided for added safety if the wearer is a railway worker or is otherwise exposed to moving machinery or snagging hazards.

Two patches of hook-and-loop fabric 5 allow LED modules 6 to be removably attached and positionable by the wearer over some selected range because the module has a bracket on its rear surface and the surface of the bracket has a patch of mating hook-and-loop material. Hook and loop fastening systems have been familiar since the late 1950s and taught, e.g., in U.S. Pat. Nos. 3,009,235, 3,083,737, 3,114,951, and 3,147,528. Applicant has found that a patch of such material with an effective contact area ~20×50 mm is more than adequate to reliably secure an LED module 6 weighing about 65 g. Patch 5 may be ~7×10 cm, which therefore allows module 6 to be repositioned to some degree by the user to direct the light most effectively. A part 3A of reflective strip 3 adjacent to patch 5 also engages patch 5 using the same hook-and-loop system, so that the strip may be partially opened to make it more convenient to remove or reposition power cable 7.

Each LED module 6 has a power cable 7 that passes underneath one portion of reflective strip 3 and over the shoulder to a battery module on the rear panel of the vest.

Figure 2:
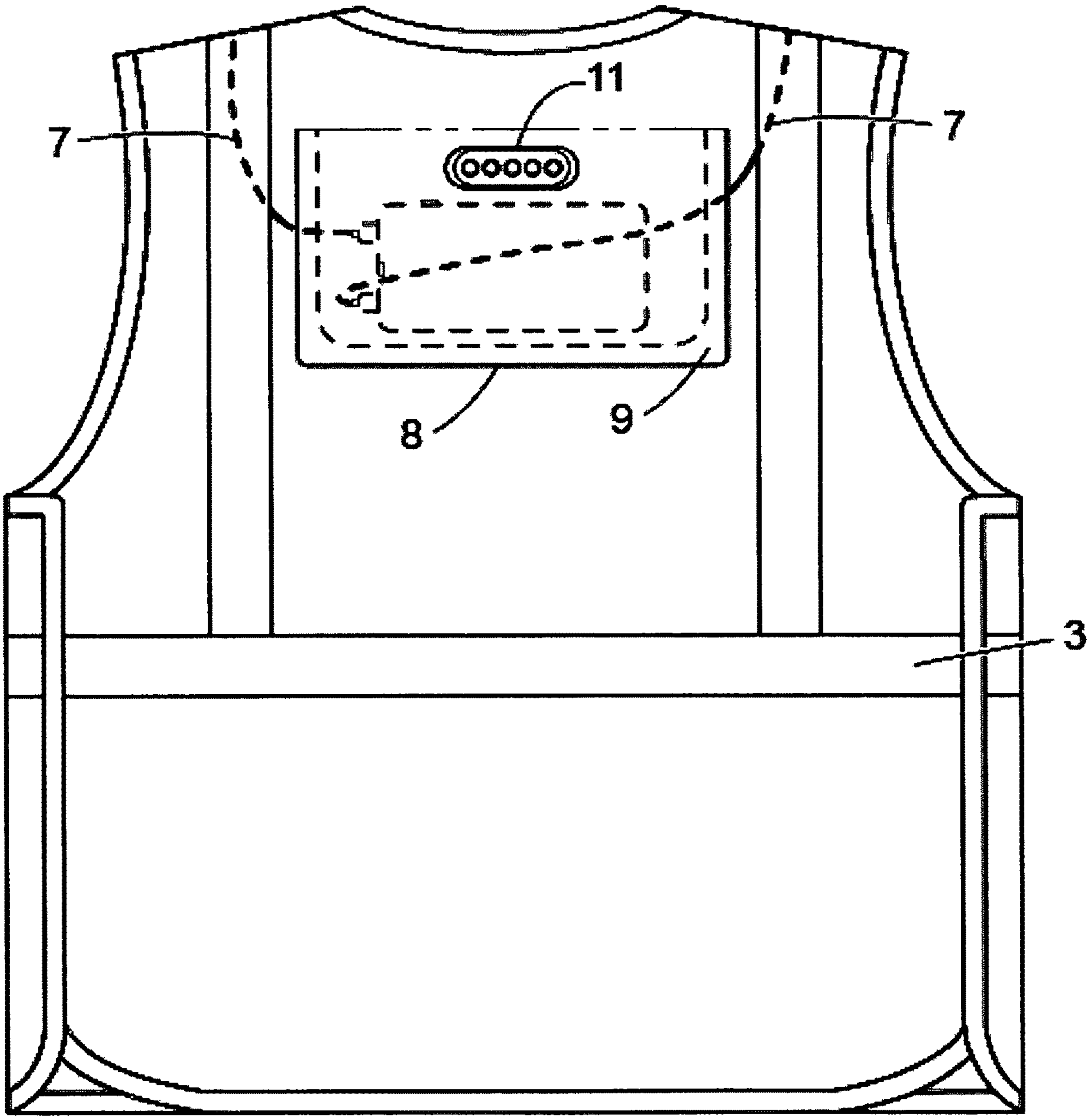
FIG. 2 is a schematic diagram of the rear view of a safety vest in accordance with one aspect of the present invention.
Figure 3:
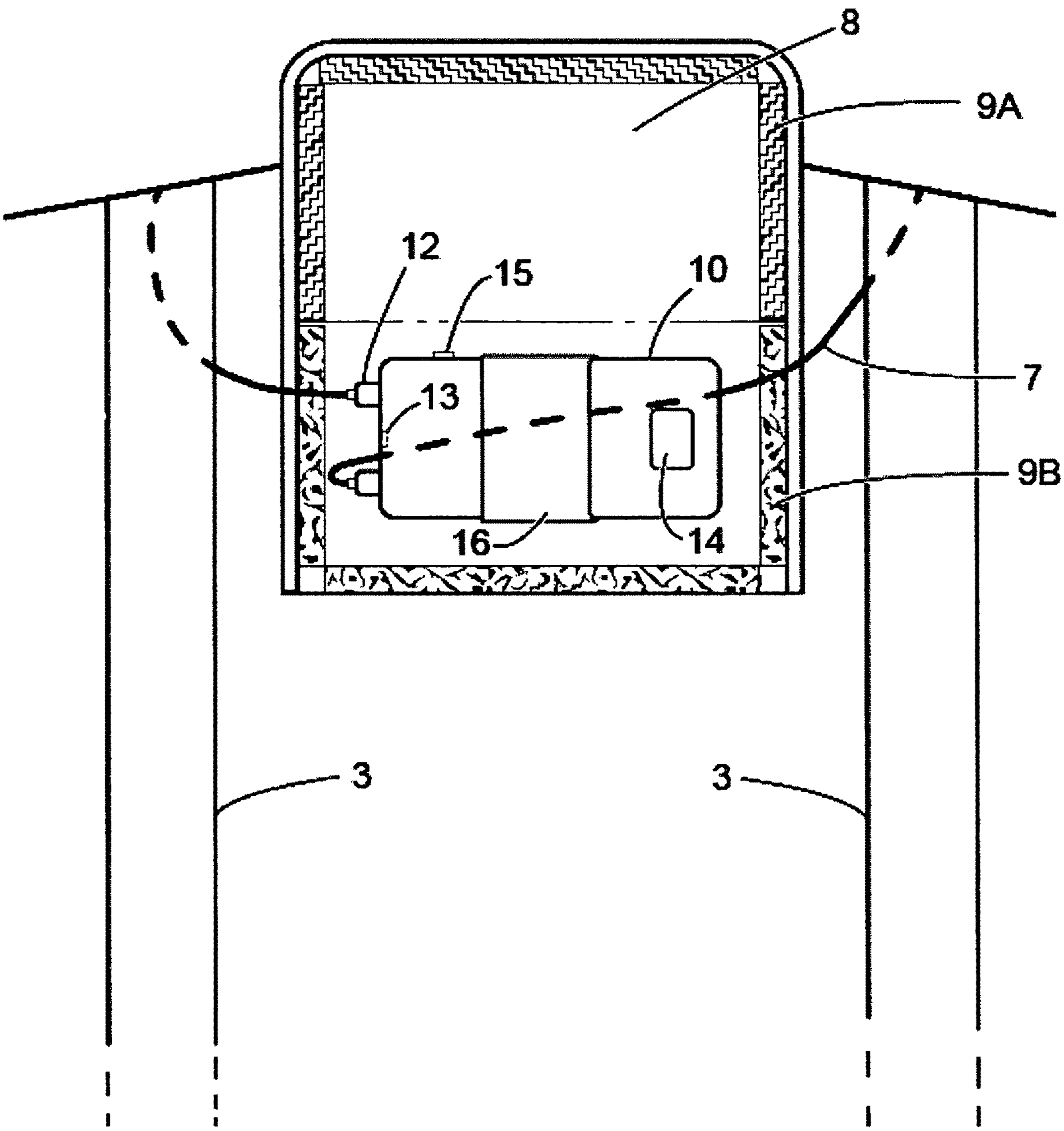
FIG. 3 shows the placement of a battery module in the rear pocket of a safety vest in accordance with one aspect of the present invention.

FIGS. 2-3 illustrate the rear view of vest 1. A pocket or elastic loop 16 is formed on the rear surface and covered by flap 8, secured along its edge by a hook-and-loop closure 9.

As can be seen from FIG. 3, when battery 10 is placed into loop 16 and covered by flap 8, it forms a weather resistant compartment for battery 10. Power cables 7 from the front LED modules emerge from under the reflective strips 3, and pass under flap 8, where they engage battery module 10, preferably using USB connectors 12 or other conventional interconnections.

Battery module 10 is preferably rechargeable, through a micro-USB port 13 or other suitable means. It preferably has a power switch 15 and may further have various internal circuits such as power conditioning and current limiting circuits, on/off indicator, status and state of charge indicator or display 14, and other features as are known in the art. One suitable battery module is the Pineng Power Bank Model PN-960 [Guangdong Pineng Industrial Co., Ltd.] dual USB charger having a rated capacity of: 3.7 V, 6000 mAh, 22.2 Wh; and rated output ≥3770 mAh, ≥18.8 Wh.

EXAMPLE

A red LED module 11 is mounted on the rear of vest 1. Module 11 may be configured to draw power via a cable from battery module 10. Alternatively, module 11 may be fully self-contained with internal battery and control circuits.

Many suitable products adaptable to be used for rear LED module 11 exist. Some of these include: the Apace GuardG3X rechargeable bike tail light; the BLITZU Cyborg 120T rechargeable light; DBLLXX superbright bike tail light; and many others. Such products typically have several user-selectable settings, such as brightness level, flash rate, flash pattern, etc. Recharging is typically done via USB or micro-USB port.

Example

Figure 4A:
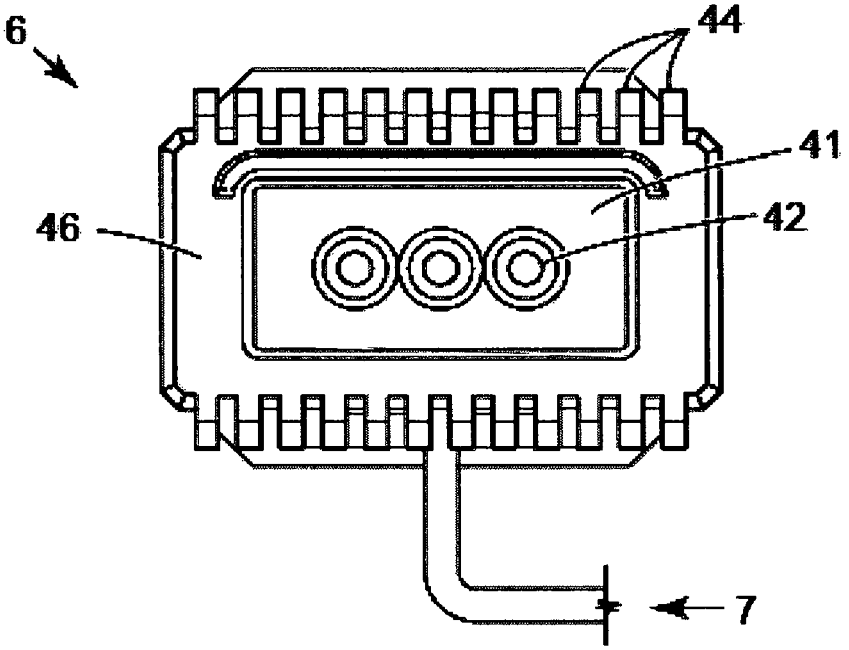
FIGS. 4A-4B show an adjustable LED module in accordance with another aspect of the present invention.
Figure 4B:
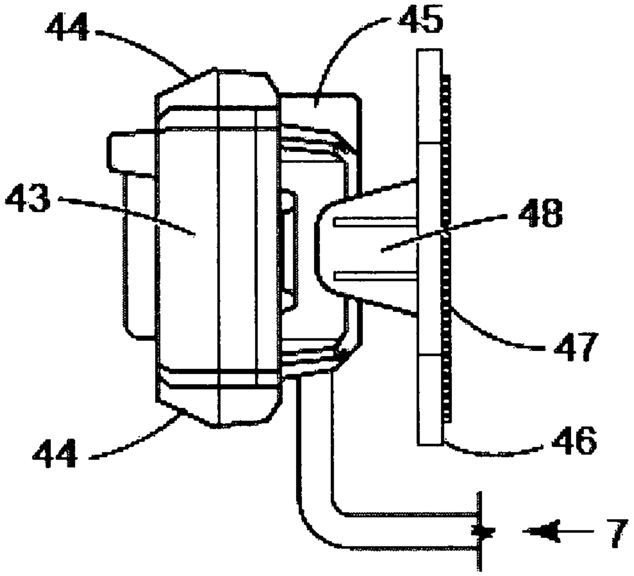

FIGS. 4A-4B illustrate front and side views of high power LED module 6. The module contains a plurality of white-light LED devices 42 contained in housing 41, which also contains the logic, drive circuit, and other electronic components. A metal heat sink, 43, may run through the module, extend outwardly around the periphery, and terminate in cooling fins 44.

Switch 45 turns the light on and may be used to adjust brightness, select flashing modes, etc., as is well known in the art.

Bracket 46 includes hook-and-loop material 47 so that module 6 can be moved by the user to various selected locations on patches 5. Bracket 46 preferably includes a pivoting mount 48 with detents, so that the module may be tilted up or down to a selected position and then retained in that position by the detent.

Module 6 may also be removed from patch 5, rotated 90°, and reattached so that the direction of the light can be rotated horizontally rather than vertically.

The invention provides a number of distinct advantages, compared to the cited background art, as well as other useful and unexpected features:

Lighted safety garments that use traditional flexible LED strips or electroluminescent wires may enhance the visibility of the wearer to others, but simply don't provide enough output power to serve as a work light or replace a powerful flashlight or headlamp. In one example of the invention, each LED module 6 has the specifications given in the following tables.

TABLE 1

Gen3 LED module output and power requirements (3 white-light LED devices per module)

| Power setting (one module) | Lumen | W | V | mA | Color temperature, K |
|---|---|---|---|---|---|
| low | 91.91 | 1 | 5 | 210 | 5665 |
| middle | 213.04 | 2.3 | 5 | 460 | 5606 |
| high | 345.94 | 3.1 | 5 | 620 | 5586 |

TABLE 2

Gen3 LED module output and power requirements (3 white-light LED devices per module)

| Power setting (two modules running together) | W | V | mA |
|---|---|---|---|
| low | 2 | 5 | 420 |
| middle | 4.6 | 5 | 920 |
| high | 6.2 | 5 | 1240 |

Compared to a head lamp, the invention produces more light, conveniently directed over a broader working area, rather than focused light right in the direction where the user is looking at them moment. This provides greater capacity to detect peripheral objects and hazards. The invention further eliminates fatigue of the neck, and eliminates the obvious hazard of a loose power cable extending from the user's waist to the headlamp in the case of external battery packs.

All the individual electronic modules are substantially water-resistant. Placement of the battery module in a covered pocket further protects it from water. The power cables run freely through spaces created between the fabric and the reflective strips required of ANSI-compliant safety vests, so that all components may be conveniently removed when laundering the garment. Furthermore, they can be removed if the fabric part of the garment is damaged, so the user can replace the (relatively low cost) fabric portion without having to replace the electronic modules.

It will be appreciated that many working environments require a vest that will be easily torn away from the wearer if snagged by a moving vehicle, rail car, etc. As can be seen in FIGS. 1-2, all of the modules and cables are located above the tear line 4 so that the user won't become entangled in the event of a safety incident.

The power supply 10 is located high in the center of the rear panel, as shown in FIG. 2. This provides the maximum protection to that module, compared to designs in which the power supply is located along the lower edge of the garment (e.g., U.S. Pat. Nos. 4,839,777 and 9,243,797), and is less annoying to the user when walking, running, or working vigorously.

It will be appreciated that the invention may be easily modified to accommodate the particular situations and needs of various workers and first responders, as described in the following examples.

Example

The vest 1 may be modified to comply with ANSI Class 3 standards by adding short sleeves and increasing the total area of reflective material.

Example

The features and modules shown in FIGS. 1-4 may be adapted to full-length raincoats as worn by firemen, sailors, National Guard personnel, and by police officers when directing traffic in the rain. The garment may further contain flotation devices for added safety when working around bodies of water. In such a configuration, it may further be preferable to make all the electronics waterproof and use hook and loop fasteners to affix the reflective strips along the entire length of the cable run, so that the vest may be assembled even though the power cables are permanently sealed to the light modules and the battery pack.

The front LED modules may be operable in a number of modes.

Example

Module 6 may contain at least three LED devices. A logic circuit can be provided to create the following functions, controlled by switch 45:

Pressing and holding the switch cycles between continuous and flash mode.

In continuous mode, each single press of the switch cycles among: low intensity; medium intensity; full intensity; and off.

In flashing mode, each single press of the switch cycles among: slow flash; rapid flash; sequential flash of individual LED devices; "SOS" flash; and off.

In many cases, the front LED modules will contain white-light LEDs in order to provide task lighting to the wearer and for maximum visibility to others. It will be appreciated that in some situations, e.g., a police officer directing traffic, blue lights may be preferable, first to identify the wearer as a policeman, and second to avoid blinding oncoming drivers. This may be done using blue LEDs, or using white LEDs and substituting a blue filter for the normally colorless transparent window. In other instances, UV LEDs may be used for crime scene investigation, or to aid a hunter tracking a wounded animal at night. IR LEDs may be used in conjunction with night-vision equipment.

It will be further appreciated that a module may have all LEDs of one color, or it may have several colors, which the user can select via the control switch. The module may have all white LEDs and a plurality of snappably attaching transparent filters of various colors, so that the user may change the transmitted color simply by snapping a particular colored filter onto the front.

The invention may be further adapted for hunters, in several ways. First, the fabric may be green or tan camouflage material, rather than high-visibility colors, and the reflective strips may be replaced by similarly-colored material. Alternatively, for daylight hunting the fabric may be orange but the strips may be of matching color, rather than reflective, to avoid startling the game. Second, the modules may be switchable from white to UV for tracking as described above.

We claim:

1. A personal lighting system comprising:

a wearable safety garment having a front surface and a rear surface, at least a portion of which comprise reflective materials;

a battery pack contained in a weather resistant pocket formed on said rear surface;

a plurality of adjustable water-resistant front LED modules located on said front surface;

water-resistant power cables running from said front LED modules to said battery, said cables concealed under flush-mounted reflective strips, wherein said safety garment has tear-away seams comprising hook-and-loop material, and all of said front LED modules, said cables, and said battery are located above a horizontal tear-away seam so that said cables will not interfere with the tear-away function; and, at least one water-resistant rear LED module located on said rear surface.

2. The lighting system of claim 1 wherein said garment comprises a high visibility fabric in a color selected from the group consisting of safety yellow and safety orange, and said garment conforms to an ANSI safety vest standard.

3. The lighting system of claim 1 wherein said battery pack is rechargeable.

4. The lighting system of claim 1 wherein said front surface comprises patches of hook and loop material.

5. The lighting system of claim 1 wherein:

each front LED module comprises a plurality of LEDs of selected color(s) whose output may be adjusted by a user among a plurality of power levels, each front LED module includes an adjustable mounting bracket providing a range of rotational adjustment and having a plurality of detents to hold said module in a selected position after adjustment, and, each mounting bracket is attached to the surface of the vest by a hook and loop fastener so that the position of said front LED module may adjusted over some selected area of the front surface.

6. The lighting system of claim 1 wherein said rear LED module comprises:

LED devices of a selected color, an integral rechargeable battery, and a control circuit.

7. The lighting system of claim 1 wherein said safety garment further comprises a flotation device.

8. A personal lighting system comprising:

a wearable high-visibility safety vest having a front surface and a rear surface, at least a portion of which comprise reflective materials;

a battery pack contained in a weather resistant pocket on said rear surface;

a plurality of adjustable water-resistant front LED modules located on said front surface and wherein, each front LED module comprises a plurality of LEDs of selected color(s) whose output may be adjusted by a user among a plurality of power levels, each front LED module includes an adjustable mounting bracket providing a range of rotational adjustment and having a plurality of detents to hold said module in a selected position after adjustment, and, each mounting bracket is attached to said surface of the vest by a hook and loop fastener so that the position of the front LED module may adjusted over some selected area of said front surface; and, water-resistant power cables running from said front LED modules to said battery, said cables concealed under flush-mounted reflective strips; and, at least one water-resistant rear LED module located on said rear surface, and further comprising:

LED devices of a selected color, an integral rechargeable battery, and a control circuit.

9. The lighting system of claim 8 wherein said safety vest conforms to a standard selected from the group consisting of: Class 1 ANSI Safety Vest, Class 2 ANSI Safety Vest, and Class 3 ANSI Safety Vest.

10. The lighting system of claim 8 wherein said safety vest includes tear-away seams comprising hook-and-loop material, and all of said front LED modules, said cables, and said battery are located above a horizontal tear-away seam so that said cables will not interfere with the tear-away function.

11. The lighting system of claim 8 wherein said LEDs in said front LED modules comprise individual devices with colors selected from the group consisting of: white, yellow, red, blue, IR, and UV.

12. The lighting system of claim 8 wherein said front LED modules comprise white LEDs and said modules are provided with a plurality of snappably-engaging color filters so that a user may change the output color of said module by changing said filter from one color to another.

13. A personal lighting system comprising:

a wearable fabric garment having a front surface and a rear surface;

a battery pack contained in a weather resistant pocket formed on said rear surface;

a plurality of adjustable water-resistant front LED modules located on said front surface, wherein said modules comprise white LEDs and said modules are provided with a plurality of snappably-engaging color filters so that a user may change the output color of said module by changing said filter from one color to another;

water-resistant power cables running from said front LED modules to said battery, said cables concealed under flush-mounted fabric strips; and, at least one water-resistant rear LED module located on said rear surface.

14. The lighting system of claim 13 wherein said fabric garment comprises a color selected from the group consisting of: camouflage green; camouflage tan; black;

and orange.

15. The lighting system of claim 13 wherein:

each front LED module comprises a plurality of LEDs of selected color(s) whose output may be adjusted by a user among a plurality of power levels, each front LED module includes an adjustable mounting bracket providing a range of rotational adjustment and having a plurality of detents to hold said module in a selected position after adjustment, and, each mounting bracket is attached to said surface of the vest by a hook and loop fastener so that the position of the front LED module may adjusted over some selected area of said front surface.

* * * * *